Jan. 5, 1971  W. F. GROSSER  3,552,192
ROTARY EXCITATION DEVICE
Filed Feb. 16, 1968  2 Sheets-Sheet 1
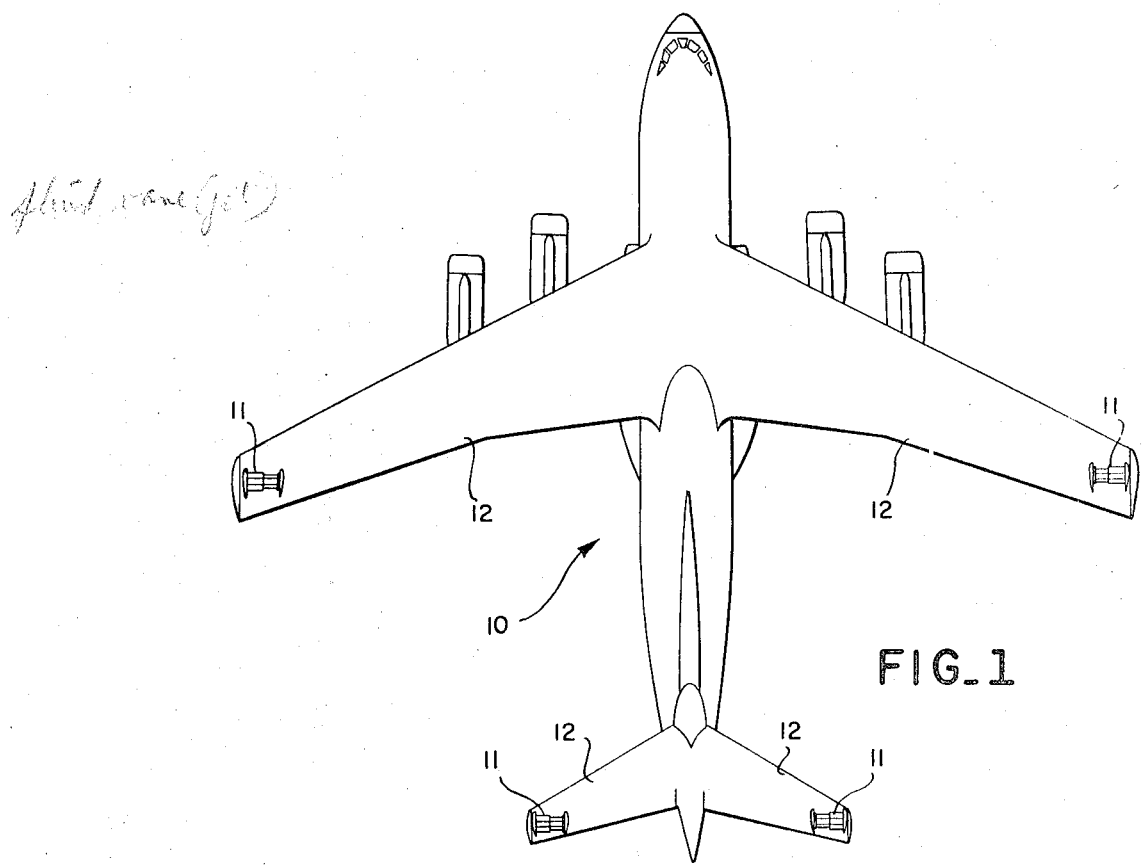
FIG_1
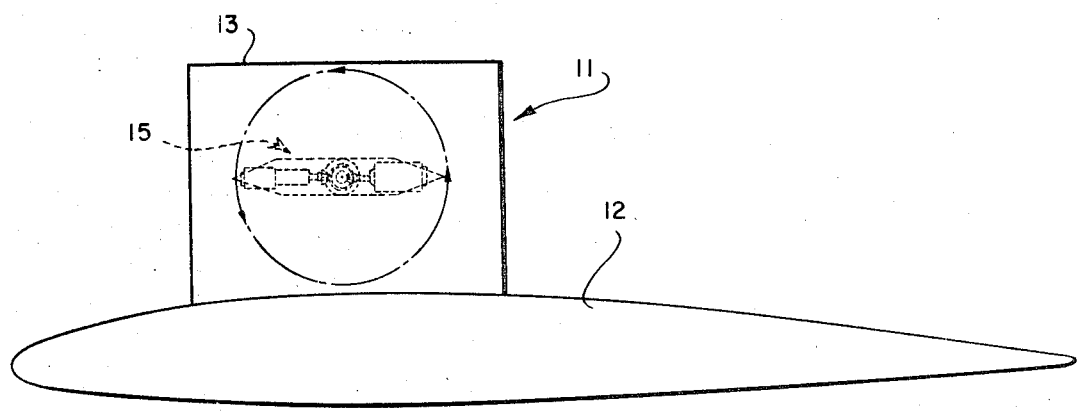
FIG_2
INVENTOR.
WILLIAM F. GROSSER
BY George C. Sullivan
Agent Jan. 5, 1971  W. F. GROSSER  3,552,192
ROTARY EXCITATION DEVICE
Filed Feb. 16, 1968  2 Sheets-Sheet 2

INVENTOR.
WILLIAM F. GROSSER
BY George C. Sullivan
Agent

United States Patent Office 3,552,192
Patented Jan. 5, 1971

3,552,192
ROTARY EXCITATION DEVICE
William F. Grosser, Marietta, Ga., assignor to Lockheed Aircraft Corporation, Burbank, Calif.
Filed Feb. 16, 1968, Ser. No. 706,032
Int. Cl. G01m 7/00
U.S. Cl. 73—71.5    10 Claims

ABSTRACT OF THE DISCLOSURE

An aerodynamic vane is mounted for rotation on the primary control surfaces of an aircraft remote from the longitudinal centerline to excite the primary structural modes throughout the aircraft basic frequencies during a flight flutter or dynamic response test program. Full 360° rotation of these vanes gives improved excitation perpendicular to the mounting plane, as well as in the fore and aft direction with a minimum size vane resulting in fewer and simplified mounting and operational problems. Each vane is linearly adjustable to vary span-wise according to the speed of the aircraft to effect a relatively constant excitation force.

---

This invention relates to excitation devices of the type employed to impart vibratory forces to structures for the purpose of testing their structural characteristics or resiliency, and more particularly to such a device that is more sensitive to applied forces to give more precise and more controllable vibrations to the structure under test than heretofore obtainable. At the same time, this proposed device is capable of producing excitation or vibratory forces in the test structure in multiple directions corresponding to basic frequencies to which the structure is expected to be exposed in subsequent actual use.

While not limited to, the present invention finds particular utility in flight testing of aircraft where it offers improvements over existing devices employed for the same purpose. In aircraft design, it is important to establish the flight vibration characteristics of the structure comprising the aircraft to the end that these will not, under normal or expected flight operational conditions, produce flutter, buzz or any other type of vibratory instability which might result in fatigue damage and a foreshortened life of the aircraft. The practice has therefore developed as a part of flight testing of each aircraft to subject the aircraft structure to known and controlled forces to assure that its vibration response characteristics fall within the predicted design range.

This has been accomplished by producing aerodynamic excitation forces, i.e., alternating up-and-down and fore-and-aft motion in the projecting members such as wings, stabilizers, etc., which motion is transmitted thereby throughout entire aircraft structure. It has been found that best results, i.e., most mechanical advantage, are obtained by locating the aerodynamic exciters at the extremities of the primary control surfaces of the aircraft. As the size of aircrafts increase, the forces required for this become of such a magnitude that the means to produce them present structural mounting and operational problems. This is particularly true where outer tip structure of primary control members will not support the attachment which must therefore be mounted further inboard than otherwise desired. This is largely occasioned by the alternating or oscillating forces required and the resulting inertia problem that is inherent in reciprocating devices heretofore used. Moreover, in such reciprocating devices the speed or excitation frequency is unduly limited.

The present invention is directed to improvements in the excitation device art whereby the necessary oscillating or vibratory forces can be applied by a minimum size member that lends itself more readily to mounting and attachment, particularly to parts of marginal structural integrity. Essentially this is accomplished by the use of different factors in deriving the excitation whereby lower cycling speeds are required, substantially reducing the mechanical problems. Better excitation is also possible not only in that the applied forces are more efficiently operative in the vertical plane, but also result in exciting the structure in the fore and aft direction, an effect not previously obtained.

As an added feature, the excitation device herein proposed is capable of adjustment in effective size whereby variable vibratory forces can be produced to thereby develop a constant excitation force under different speeds in the case of the aircraft. Also, special means is provided to isolate changing aerodynamic flow patterns whereby the applied forces are applicable for various flight attitudes. Since the size of the device has been reduced to a minimum, no special consideration must be made for its presence during the test flights.

More specifically, this excitation device consists of an aerodynamic vane idsposed adjacent the outer tip of each aircraft wing and horizontal stabilizer at right angles to the direction of flight, being rotatably mounted between a pair of projecting supports. This vane is formed in telescopic sections, the largest of which, although free to rotate, is secured against all lateral movement relative to the associated support and the innermost one terminates in an end plate constituting a defining end of the vane in the contracted position, i.e., when its length is reduced by appropriate means internally thereof. The location of the vane's rotatable mount with respect to the adjacent surface of the wing is such as to dispose the opposite edges of the vane alternately in proximity to the surface with each one-half revolution thereof.

With the above and other objects in view as will be apparent, this invention consists in the construction, combination and arrangement of parts all as hereinafter more fully described, claimed, and illustrated in the accompanying drawings wherein:

FIG. 1 is a top plan view of an airplane with a rotary excitation device designed and constructed in accordance with the teachings hereof operatively mounted adjacent the outer end or tip of each wing and horizontal stabilizer to show the organization of multiple such devices on a test airplane;

FIG. 2 is a transverse profile taken through one of wings or stabilizers inboard of the rotary excitation device mounted thereon and looking outboard to show a side elevation of the device and the circle it scribes when operative as related to the associated wing or stabilizer;

Figure 3:
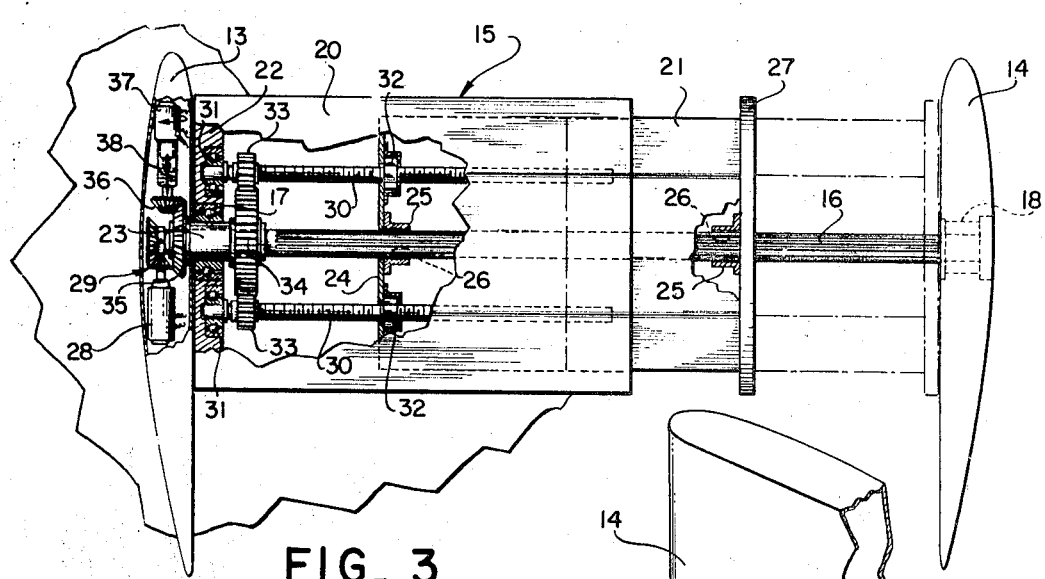
Figure 4:
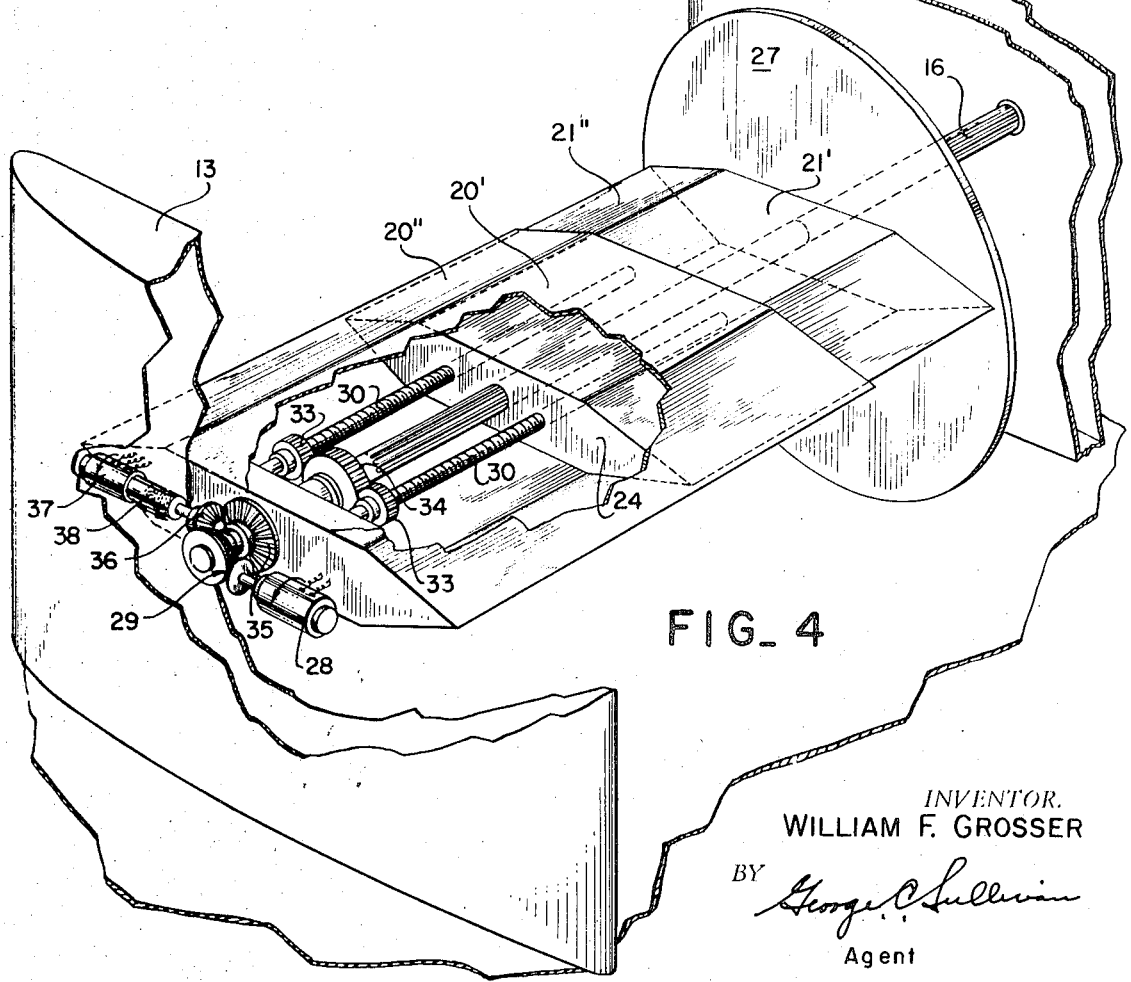

FIG. 3 is a top plan view of one of the excitation devices as illustrated in FIG. 1 but at an appreciably larger scale and showing only a fragment of the associated wing or stabilizer, parts of the device having been broken away to reveal internal structure and the mechanism thereof by which it is operated and the vane being located in an intermediate position of its linear adjustment with the fully extended position indicated by phantom lines; and FIG. 4 is a perspective view otherwise similar to FIG. 3 to further show the interrelationship of parts that comprise each excitation device.

Referring more particularly to the drawings, 10 represents a typical test aircraft with a full complement of excitation devices mounted thereon. Following the customary practice, an excitation device 11 is mounted adjacent the outer tip of each horizontal surface 12 of the airplane, i.e., the wings and stabilizers. Usually, such devices 11 operate in pairs, either symmetrically or asymmetrically, i.e., in phase one with the other or at 90° out of phase. When equipped for flight test, the airplane 10 includes all of the devices 11, as shown in FIG. 1. Their interconnecting mechanism to synchronize their operation as above stated or otherwise, forming no part per se of the invention, has been omitted lest it complicate the disclosure and impede a clear understanding of the invention covered hereby.

Preferably each of these devices 11 is adapted to be removably secured to the associated airplane component in any convenient manner following any known practice. Moreover, each such device 11 is for all intents and purposes identical so that the description that follows is equally applicable to all.

A pair of spaced supports or pylons 13 and 14 is removably connected in any conventional manner to the upper surface of the associated airplane component 12 adjacent the outermost tip thereof, the end closing rib or transverse bulkhead of the component 12 being employed to connect the outermost pylon and give maximum structural strength to the mounting. Each pylon 13 and 14 is of streamline shape disposed fore and aft in the airstream. A rotary, telescoping vane 15 is adapted to be mounted between the pylons on a rotary shaft 16 secured at opposite ends to the pylons 13 and 14. For this purpose, each pylon 13 and 14 carries a fixed bearing 17 and 18 respectively in which the shaft 16 is rotatably mounted. The bearing 17 associated with the outermost pylon 13 is secured to the exterior surface thereof facing the inner pylon 14 while the bearing 18 associated with the inner pylon 14 is mounted completely internally thereof for reasons to become more apparent.

The vane 15 is made up of two sections 20 and 21 each of which is hollow and for structural reasons is formed by flat parallelly disposed and spaced center surfaces 20' and 21' with interconnecting triangular or wedge-shaped ends 20'' and 21''. Preferably the larger section 20 is associated with the outer pylon 13 to which it is connected against relative lateral movement through a sleeve 23 passing through the transverse end wall 22 and rotatably mounted in the bearing 17. The smaller or inner section 21 is slidably mounted on the shaft 16 through a spline connection.

To the above ends, the inner end of the smaller section terminates in a transverse wall 24 which is pierced centrally with an opening for the passage of the shaft 16. On the inner surface of the wall 24 is a bearing 25 with an aligned opening through which the shaft 16 passes. The shaft 16 is splined and keys or serrations 26 on the inner surface of the bearing 25 with such splines in mating engagement whereby the entire inner section 21 is free to slide on the shaft 16, but is fixed against relative rotation therewith.

At its outer end, the inner section 21 terminates in a closure plate 27 which is a disc centrally pierced for passage of the shaft 16. The diameter of the plate 27 preferably falls within a range of at least equal to the transverse dimension of the smaller or inner section 21 and not greater than the transverse dimension of the outer or larger section 20. A bearing 25 similar in all respects to the one associated with the end wall 24 is appropriately secured to the plate or disc 27 to facilitate such passage of the shaft 16. Thus, the entire vane assembly comprising telescopic sections 20 and 21 is adapted to rotate as a unit on the shaft 16. Such rotation is effected by suitable drive means such as, for example, an electric or hydraulic motor 28 connected by a conventional bevel gear arrangement 29 to the inner end of the shaft 16. The motor 28 and gear arrangement 29 are both adapted to be mounted internally of the pylon 13 with appropriate attachments or fittings to receive connecting lines from a suitable power source.

In order to provide linear adjustment of the sections 20 and 21, a pair of screw jack 30 is provided with gear connections to an appropriate drive source. One of the screw jacks 30 is mounted on each side of the shaft 16, being secured to the end wall 22 of the outer telescopic section 20 in an antifriction bearing 31 and passing through an opening in the wall 24 of the inner telescopic section 21 provided therefor and through a similar bearing 32 secured to such wall 24. Adjacent the wall 22 each screw jack 30 carries a gear 33 which is keyed thereto so as to constitute, in effect, an integral part thereof and adapted to mesh with a drive gear 34 carried by the sleeve 23 rotatably mounted on the shaft 16 as described.

At its other end the sleeve 23 terminates internally of the pylon 13 where it mounts a bevel gear 35 which is keyed or otherwise immovably secured to it in any appropriate manner. A coacting pinion gear 36 of a drive motor 37 mounted within the pylon 13 is adapted to mesh with the gear 35 and thereby connect the sleeve 23 to a motor 37. This drive motor 37 is preferably electrically powered being connected by appropriate electrical lines to a suitable power source and includes a solenoid 38 for the reciprocation of the core or shaft on which the pinion gear 36 is mounted. Thus the pinion gear 36 is engaged and disengaged from the bevel gear 35 as desired. When engaged and the motor 37 is operating, the bevel gear 35 is rotated thereby and the gears 33 associated with the screw jacks 30 are concurrently rotated to extend and contract the vane sections 20 and 21 whereby the effective length of the vane 15 is adjusted. During this adjustment the gear arrangement 29 serves to lock the shaft 16 against relative rotation.

When the pinion 36 is disengaged from the bevel gear 35 by operation of the solenoid 38 and the motor 28 is operated, the shaft 16 is rotated thereby and the entire vane assembly 15 at its adjusted length is rotated at the desired speed as established by the motor 28. When thus rotated, the vane 15 scribes a circle as shown in FIG. 2 whereby alternate lifting forces and drag loads are imposed on the associated component 12 as one tip of the vane 15 approaches the associated surface 12 with each one-half revolution. Thus, with each 180° angle of the vane 15 first a positive and then a negative lifting force with an intermediate aft drag force are applied to the associated surface 12 creating the vibration required in order to excite the primary strucural modes throughout the aircraft 10 at the desired and controlled rate. For each complete revolution of the vane the aircraft sturcture is excited twice thereby so that for any desired excitaion frequency the vane need only be rotated at one half the desired frequency.

Although shown and described in what is believed to be the most practical and preferred embodiment, it is apparent that departures from the specific structures shown will suggest themselves to those skilled in the art and may be made without departing from the spirit and scope of the invenion. The invention, therefore, should not be restricted to the particular forms of construction illustrated and described, but is intended to encompass all modifications and variations that may fall within the scope of the appended claims.

What is claimed is:

1. A roary excitation device for producing forces on a structure having motion relative to a fluid stream, comprising a vane having transverse and longitudinal axes, one surface of said vane being substantially parallel to said axes and mounted adjacent the center of its transverse axis for rotation relative to said structure, and a drive operatively connected to said vane for the rotation thereof about an axis generally coincident with said longitudinal axis, the vane being mounted relative to said structure such that said logintudinal axis is generally transeverse to said fluid stream and the longitudinal edges of said vane approach and recede from said said structure when the vane is rotated whereby aerodynamic forces are produced on said structure in alternately opposite directions with each one-half revolution of said vane.

2. The device of claim 1 wherein said vane includes at least two telescopically associated sections interconnected by a linearly adjustable connection whereby its effective length may be varied.

3. The device of claim 1 wherein said vane is mounted is opposite ends on supports each of streamline section disposed in a plane generally perpendicular to said vane and secured to and projecting laterally from said structure.

4. The device of claim 2 wherein each said section is formed by flat parallelly disposed and spaced center surfaces interconnected by triangular end surfaces, the corresponding surfaces of each of said sections being a predetermined different dimension from the next adjacent section to permit sliding coaction therewith facilitating the telescopic adjustment aforesaid.

5. The device of claim 3 wherein the transverse dimension of said vane is such that the opposite edges thereof are disposed alternately in proximity to said structure with each one-half revolution as aforesaid.

6. The device of claim 3 wherein said vane includes at least two telescopically associated sections with one of said sections being rotatably secured at one of its ends to one of said supports and the most remote of the other of said sections being secured to a circular plate at its outer end, the diameter of said plate being at least as large as the transverse dimension of the smallest of said sections and not larger than the transverse dimension of the largest of said sections.

7. The device of claim 2 wherein each said section is hollow and said connection includes a splined shaft carried by one of said sections, engagements carried by the next adjacent said section and cooperative with said shaft splines, at least one screw rotatably secured to said one section and threadably secured to said next adjacent section, and a releasable drive connected to each screw for the rotation thereof.

8. The device of claim 7 wherein multiple screws are employed, and including a constantly operative engagement between said screws for the rotation thereof in unison by said drive when operative.

9. The device of claim 6 wherein said structure is a primary control surface of an aircraft and said vane is mounted thereon at a location remote from the longitudinal centerline of the aircraft.

10. The invention of claim 9 wherein multiple symmetrically arranged such devices are mounted on said aircraft and adapted to operate in phase one with another and also at 90° out of phase.

References Cited
UNITED STATES PATENTS 3,074,385   1/1963   Nass _____ 73—67.2X
3,113,451   12/1963   Beals, Jr. et al. _____ 73—67.2

JAMES J. GILL, Primray Examiner